(12) United States Patent
Talbott

(10) Patent No.: US 8,348,208 B1
(45) Date of Patent: Jan. 8, 2013

(54) VEHICLE WINDOW SUPPORT APPARATUS

(76) Inventor: Marco A. Talbott, Riverview, FL (US)

(*) Notice: Subject to any disclaimer, the term of this patent is extended or adjusted under 35 U.S.C. 154(b) by 0 days.

(21) Appl. No.: 12/779,390

(22) Filed: May 13, 2010

(51) Int. Cl.
*A45D 42/14* (2006.01)
*F16B 47/00* (2006.01)

(52) U.S. Cl. .................. 248/206.3; 248/309.3

(58) Field of Classification Search ............ 248/206.5, 248/205.5, 205.7, 205.8, 205.9, 206.1, 206.3, 248/362, 363, 309.3, 683, 467, 537, 206.2; 269/21
See application file for complete search history.

(56) References Cited

U.S. PATENT DOCUMENTS

| | | | | |
|---|---|---|---|---|
| 1,575,789 A | * | 3/1926 | Phelps | 248/205.5 |
| 1,885,103 A | * | 11/1932 | Barnett | 248/206.1 |
| 2,157,001 A | * | 5/1939 | Morley | 248/205.6 |
| 3,114,530 A | * | 12/1963 | Shilling | 248/476 |
| 4,455,006 A | * | 6/1984 | Aaserude | 248/205.6 |
| 4,691,851 A | * | 9/1987 | Aaserude | 224/482 |
| 5,390,837 A | * | 2/1995 | Ruffolo, Jr. | 224/482 |
| D381,307 S | | 7/1997 | Gwynn et al. | |
| 5,678,793 A | * | 10/1997 | Hill | 248/206.3 |
| 5,862,816 A | * | 1/1999 | Lowe | 132/291 |
| 5,974,711 A | * | 11/1999 | Tipke | 40/591 |
| 6,010,102 A | * | 1/2000 | Dillion, Jr. | 248/206.3 |
| 6,050,560 A | | 4/2000 | Schuetteler | |
| 6,193,396 B1 | * | 2/2001 | Winger et al. | 362/392 |
| 6,578,248 B1 | * | 6/2003 | Boldizar | 29/281.5 |
| 6,837,645 B2 | | 1/2005 | Kanatani et al. | |
| 2007/0240833 A1 | | 10/2007 | Watson | |

* cited by examiner

*Primary Examiner* — Nkeisha Smith

(57) ABSTRACT

The vehicle window support apparatus provides for a user to hold a vehicle window in a desired position, relative to up and down, without the typical vehicle window support mechanisms. The apparatus does not need tools or hard installation into the vehicle. Instead, suction cups hold the window. The apparatus lower vertical member and horizontal member position the apparatus within the existing window channel of a given vehicle. The slanted member enables the upper vertical member to be proximal to the window itself, whereby the suction cups are then temporarily and removably affixed to the window, holding the window as desired by a user. Upon termination of use, the apparatus suction cups are easily removed from the window and the lower vertical member removed from the window channel.

2 Claims, 4 Drawing Sheets

VEHICLE WINDOW SUPPORT APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

TO ALL WHOM IT MAY CONCERN

Be it known that I, Marco A. Talbott, a citizen of the United States, have invented new and useful improvements in a vehicle window support apparatus as described in this specification.

BACKGROUND OF THE INVENTION

Window of cars and trucks and other vehicles are typically put up, down, and placed anywhere there between by either a window crank or electrically operated mechanism. Windows are usually bonded to a supporting frame of some sort. For example, vehicle windows are often supported below by a bonded frame, and guided by fore and aft by window channels and an existing lower window channel fitted within the vehicle body. For various reasons, windows often need support outside of that originally provided by the vehicle's manufacturer. A window might become dislodged from the supporting frame. A window might not be correctly guided by the window channels. Also, mechanisms for raising and lowering windows sometimes fail. Failure may even find the vehicle operator waiting for parts and repair. What ever the cause of window problems, it is often necessary to support a vehicle window by something other than that originally provided.

The present apparatus provides a basic, easily employed device that supports a vehicle window and is easily attached and detached from the window and vehicle.

FIELD OF THE INVENTION

The vehicle window support apparatus relates to vehicle windows and more especially to window support apparatus that supports a window and is easily attached and detached.

SUMMARY OF THE INVENTION

The general purpose of the vehicle window support apparatus, described subsequently in greater detail, is to provide a vehicle window support apparatus which has many novel features that result in an improved vehicle window support apparatus which is not anticipated, rendered obvious, suggested, or even implied by prior art, either alone or in combination thereof.

To attain this, the vehicle window support apparatus provides for a user to hold a vehicle window in a desired position, relative to up and down, without the typical vehicle window support mechanisms. This may occur when support mechanisms are in need or repair. Such an instance may occur when a vehicle is being disassembled or reassembled or at any time when the conventional support mechanisms are either not desirable or usable.

The apparatus does not need tools or hard installation into the vehicle. Instead, one of more suction cups hold the window. While the apparatus may be provided in very basic forms, the ideal form of the apparatus may provide a lower vertical member and horizontal member that position the apparatus within the existing window channel of a given vehicle. The slanted member may enable the upper vertical member to be proximal to the window itself, whereby the suction cups may then temporarily and removably affix to the window, holding the window as desired by a user. Upon termination of use, the apparatus suction cups are simply removed from the window and the lower vertical member removed from the window channel.

Thus has been broadly outlined the more important features of the improved vehicle window support apparatus so that the detailed description thereof that follows may be better understood and in order that the present contribution to the art may be better appreciated.

An object of the vehicle window support apparatus is to support a vehicle window without assistance from original vehicle window support mechanisms.

Another object of the vehicle window support apparatus is to be easily attached to a vehicle window.

A further object of the vehicle window support apparatus is to be easily detached from a vehicle window.

An added object of the vehicle window support apparatus is to be utilized without tools.

And, an object of the vehicle window support apparatus is to support a vehicle window without vehicle alteration.

Yet another object of the vehicle window support apparatus is to support a vehicle window without damage to the vehicle or window.

These together with additional objects, features and advantages of the improved vehicle window support apparatus will be readily apparent to those of ordinary skill in the art upon reading the following detailed description of presently preferred, but nonetheless illustrative, embodiments of the improved vehicle window support apparatus when taken in conjunction with the accompanying drawings.

In this respect, before explaining the current embodiments of the improved vehicle window support apparatus in detail, it is to be understood that the vehicle window support apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved vehicle window support apparatus. It is therefore important that the claims be regarded as including such equivalent constructions insofar as they do not depart from the spirit and scope of the vehicle window support apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 5 thereof, the principles and concepts of the vehicle window support apparatus generally designated by the reference number 10 will be described.

Figure 1:
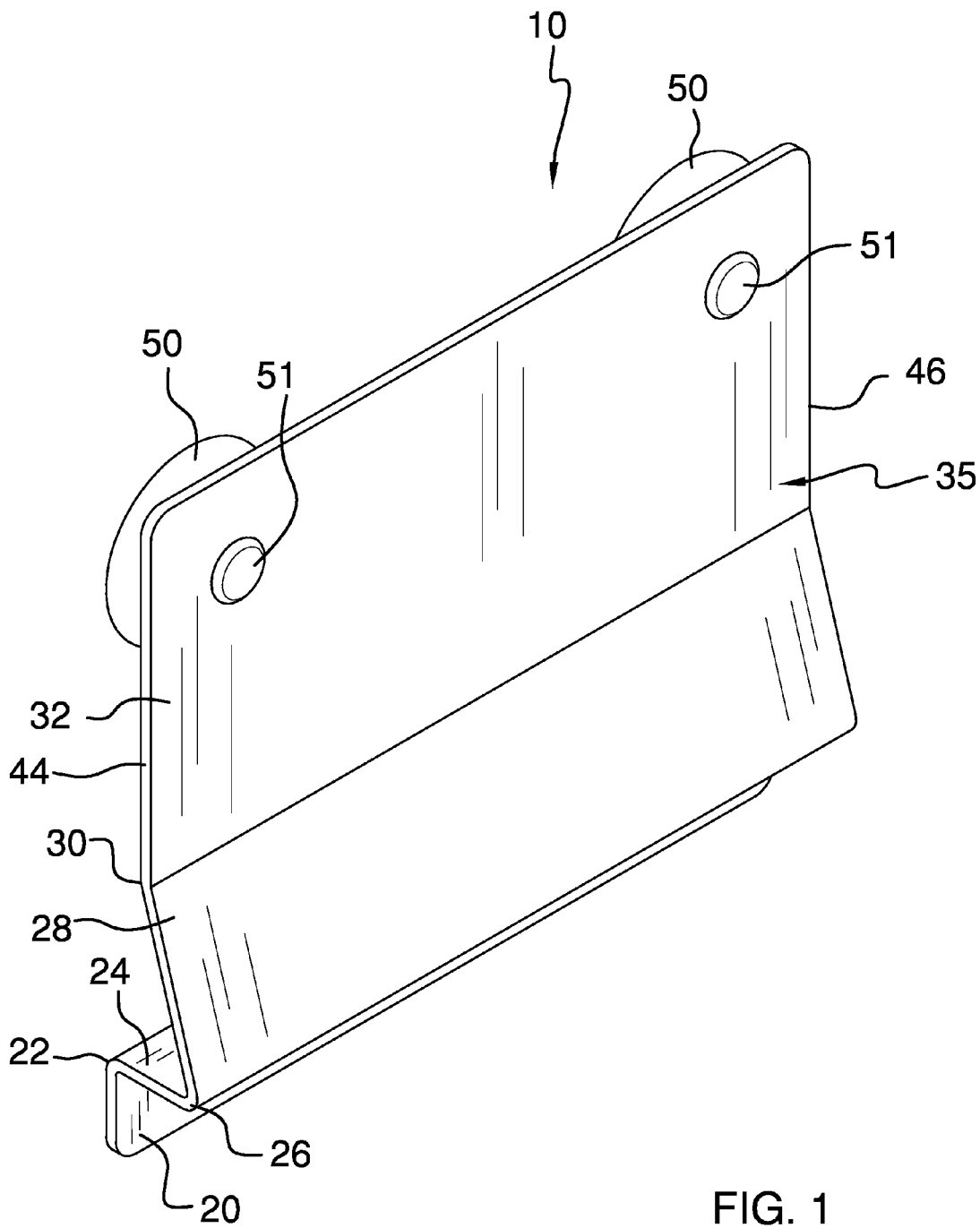
FIG. 1 is a perspective view.

Referring to FIG. 1, the apparatus 10 partially comprises the first end 44 spaced apart from the second end 46.

Figure 2:
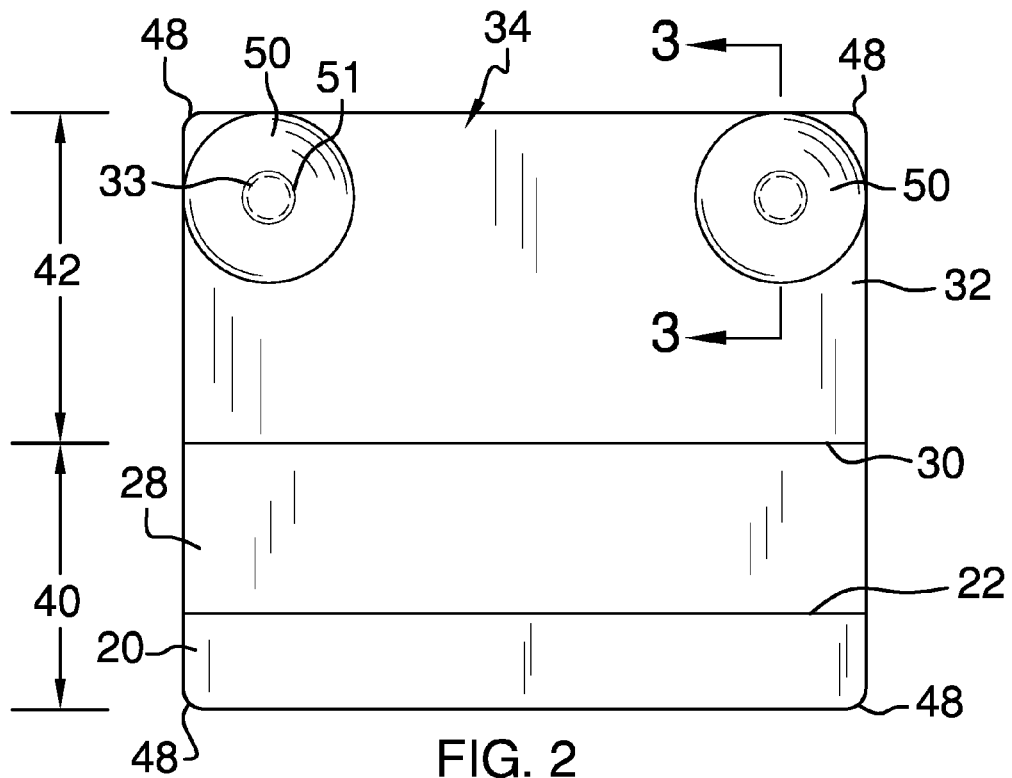
FIG. 2 is a first side elevation view.
Figure 4:
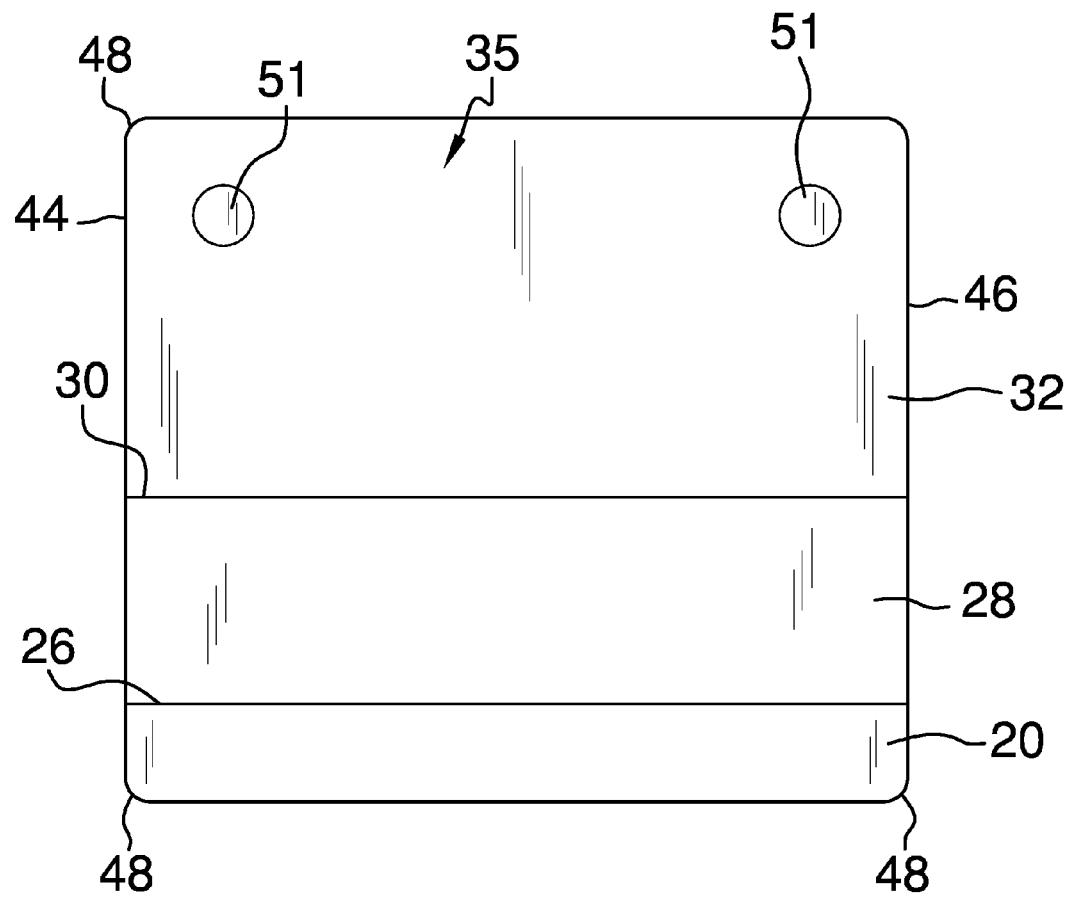
FIG. 4 is a second side elevation view.

Referring to FIGS. 2 and 4, the apparatus 10 partially comprises the first side 34, the second side 35, and a quartet of spaced apart rounded corners 48.

Figure 3:
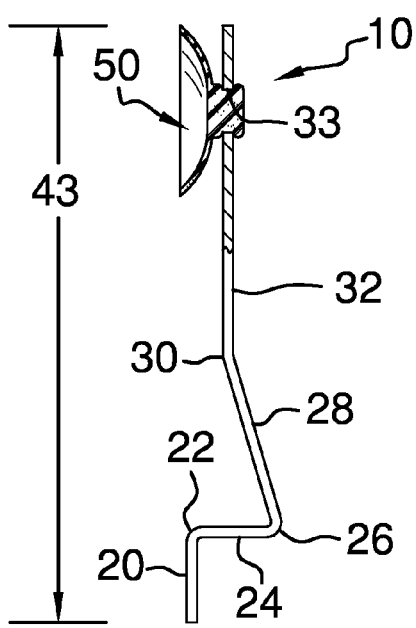
FIG. 3 is a first end partial cross sectional view of FIG. 2, taken along the line 3-3.

Referring to FIG. 3, the apparatus 10 comprises a total height 43.

Referring to FIGS. 2 and 3, the lower vertical member 20 has two of the spaced apart rounded corners 48. The first bend 22 is disposed atop the lower vertical member 20. The first bend 22 is about 90 degrees. The horizontal member 24 is extended from the first bend 22. The horizontal member 24 is extended perpendicular to the lower vertical member 20. The horizontal member 24 is extended from the first side 34 to the second side 35.

The second bend 26 ends the horizontal member 24 at the second side 35. The second bend 26 is greater than 90 degrees. The slanted member 28 is extended upwardly from the second bend 26 toward the first side 34. The third bend 30 is disposed atop the slanted member 28. The third bend 30 is angled opposite the second bend 26. The upper vertical member 32 is extended upwardly from the third bend 30. The upper vertical member 32 is parallel to the lower vertical member 20. The upper vertical member 32 has a second height 42. The first height 40 is comprised of the lower vertical member 20, the first bend 22, the horizontal member 24, and the second bend, and the slanted member 28. The first height 40 is about equal to the second height 42. The first height 40 and the second height 42 comprise the total height 43.

Referring to FIG. 3, the pair of spaced apart orifices 33 is disposed within the upper vertical member 32. One of each of the orifices 33 is proximal to one of each of the rounded corners 48. An identical suction cup 50 is affixed within each orifice 33 by a suction cup 50 button 51. Each suction cup 50 faces the first side 34.

Figure 5:
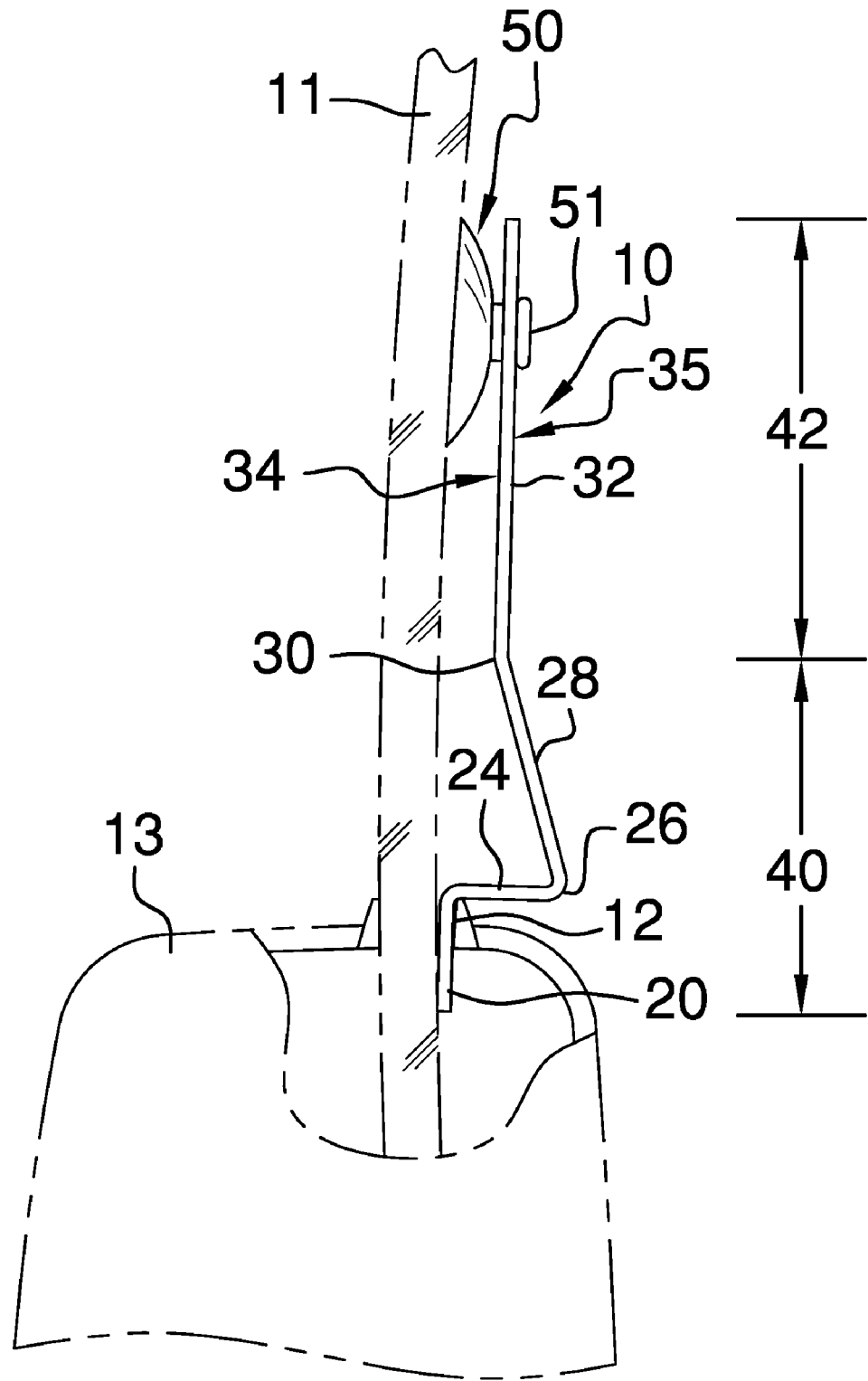
FIG. 5 is a first end elevation view of the apparatus in use.

Referring to FIG. 5, the suction cups 50 are removably affixed to the existing window 11 of a vehicle. The lower vertical member 20 is removably inserted between the window 11 and an existing body part 13 of the vehicle, typically within the existing window channel 12.

With respect to the above description then, it is to be realized that the optimum dimensional relationships for the parts of the vehicle window support apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the vehicle window support apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the vehicle window support apparatus may be used.

Therefore, the foregoing is considered as illustrative only of the principles of the vehicle window support apparatus. Further, since numerous modifications and changes will readily occur to those skilled in the art, it is not desired to limit the vehicle window support apparatus to the exact construction and operation shown and described, and accordingly, all suitable modifications and equivalents may be resorted to, falling within the scope of the vehicle window support apparatus.

What is claimed is:

1. A vehicle window support apparatus comprising:
   a first end spaced apart from a second end, a first side and a second side,
   a quartet of spaced apart rounded corners, and a total height;
   a lower vertical member having two of the spaced apart rounded corners; an upper vertical member having two of another of the spaced apart rounded corners
   a first bend disposed atop the lower vertical member;
   a horizontal member extended from the first bend, the horizontal member extended perpendicular to the lower vertical member, the horizontal member extended from the first side to the second side;
   a second bend ending the horizontal member at the second side;
   a slanted member extended upwardly from the second bend toward the first side;
   a third bend disposed atop the slanted member, the third bend angled opposite the second bend;
   the upper vertical member extended upwardly from the third bend, the upper vertical member parallel to the lower vertical member, the upper vertical member having a second height;
   a first height comprised of the lower vertical member, the first bend, the horizontal member, the second bend, and the slanted member, the first height about equal to the second height, the first height and the second height comprising a total height;
   a pair of spaced apart orifices disposed within the upper vertical member, each of one of the orifices proximal to one of each of the rounded corners of the upper vertical member;
   an identical suction cup affixed within each orifice by a suction cup button, each suction cup facing the first side;
   whereby the suction cups are removably affixed to an existing window of a vehicle, and the lower vertical member removably inserted between the window and an existing body part of the vehicle.

2. A vehicle window support apparatus comprising:
   a first end spaced apart from a second end, a first side and a second side,
   a quartet of spaced apart rounded corners, and a total height;
   a lower vertical member having two of the spaced apart rounded corners; an upper vertical member having two of another of the spaced apart rounded corners
   a first bend disposed atop the lower vertical member, the first bend about 90 degrees;
   a horizontal member extended from the first bend, the horizontal member extended perpendicular to the lower vertical member, the horizontal member extended from the first side to the second side;
   a second bend ending the horizontal member at the second side, the second bend greater than 90 degrees;
   a slanted member extended upwardly from the second bend toward the first side;

a third bend disposed atop the slanted member, the third bend angled opposite the second bend;

the upper vertical member extended upwardly from the third bend, the upper vertical member parallel to the lower vertical member, the upper vertical member having a second height;

a first height comprised of the lower vertical member, the first bend, the horizontal member, the second bend, and the slanted member, the first height about equal to the second height, the first height and the second height comprising a total height;

a pair of spaced apart orifices disposed within the upper vertical member, each of one of the orifices proximal to one of each of the rounded corners of the upper vertical member;

an identical suction cup affixed within each orifice by a suction cup button, each suction cup facing the first side;

whereby the suction cups are removably affixed to an existing window of a vehicle, and the lower vertical member removably inserted between the window and an existing body part of the vehicle.

\* \* \* \* \*